United States Patent [19]
Rautiola et al.

[11] Patent Number: 5,956,331
[45] Date of Patent: Sep. 21, 1999

[54] INTEGRATED RADIO COMMUNICATION SYSTEM

[75] Inventors: Markku Rautiola; Jouni Mikkonen, both of Tampere, Finland

[73] Assignee: Nokia Mobile Phones Limited, Salo, Finland

[21] Appl. No.: 08/711,465

[22] Filed: Sep. 11, 1996

[30] Foreign Application Priority Data

Sep. 29, 1995 [FI] Finland ................................... 954639

[51] Int. Cl.$^6$ ................................................. H04J 3/02
[52] U.S. Cl. ......................... 370/338; 370/252; 370/329; 370/401
[58] Field of Search ................................... 370/316, 321, 370/332, 337, 338, 347, 396, 401, 252, 310, 431, 329, 341

[56] References Cited

U.S. PATENT DOCUMENTS

| | | | |
|---|---|---|---|
| 5,257,257 | 10/1993 | Chen et al. | 370/18 |
| 5,457,680 | 10/1995 | Kamm et al. | 370/332 |
| 5,473,669 | 12/1995 | Kanada et al. | 379/59 |
| 5,640,386 | 6/1997 | Wiedeman | 370/321 |
| 5,771,459 | 6/1998 | Demery et al. | 370/401 |

FOREIGN PATENT DOCUMENTS

| | | |
|---|---|---|
| 2131349 | 5/1995 | Canada . |
| 0 483 545 A1 | 5/1992 | European Pat. Off. . |
| 0 526 106 A2 | 2/1993 | European Pat. Off. . |
| 0 539 737 A1 | 5/1993 | European Pat. Off. . |
| 0 605 957 A1 | 7/1994 | European Pat. Off. . |
| 0 605 989 A1 | 7/1994 | European Pat. Off. . |
| 0 622 924 A2 | 11/1994 | European Pat. Off. . |
| WO 93/07684 | 4/1993 | WIPO . |

Primary Examiner—Douglas W. Olms
Assistant Examiner—Shick Hom
Attorney, Agent, or Firm—Perman & Green, LLP

[57] ABSTRACT

The invention relates to an integrated data transfer system, the extensive basis of which is constituted by a general cellular radio system, preferably the GSM system, and in which a radio local area network, preferably the HIPERLAN network, is used for communication between data terminals (3a, 3b, 3c, 3d, 3e, 3f) in small areas with dense communications. In addition, the Internet network (6) is used for fast data transfer. The connection between networks is controlled and handled by a gateway computer (1) located in each radio local area network. In view of the cellular radio system, the gateway computer operates like a base station controller (BSC). The radio local area network consists of the coverage areas or cells (4b, 4c) of the data terminals, and it can be formed, changed and dissolved freely. The computer terminals (3c) preferably have an Internet address enabling mobility, whereby the gateway computer (1) handles the routing to the nodes of the network and the mobile Internet nodes visiting it. In a home or small office environment (HE) there can be formed a small-scale radio local area network, the gateway (10) of which is by means of an existing connection and the corresponding general data transfer network (8) connected to a certain, larger local area network, preferably located in an office environment.

23 Claims, 5 Drawing Sheets

INTEGRATED RADIO COMMUNICATION SYSTEM

BACKGROUND OF THE INVENTION

The present invention relates to radio data transfer networks in general and, more specifically, to the integration of a radio local area network into a larger data transfer network offering global communication possibilities.

The rapidly developing and expanding telecommunication technology has reached a state in which there are technically advanced but mutually incompatible solutions available for different purposes. In general, telecommunication systems can be divided into two main groups, one group consisting of voice and facsimile transfer (telephone services), and the other group of fast digital data transfer between computers. Data terminals of the first group include telephones, voice mail systems, telephone answering machines, telecopiers and facsimile servers. Data transfer takes place mainly as circuit switched services, whereby digitized data are transferred at an even speed, 64 kbit/s at the most, and there are no sudden peaks in the transfer speed. In the second group, the data terminals include servers, printers, user stations and personal computers, and data transfer takes place as packet switching in local area networks and other corresponding networks at a speed which can be as high as 100 Mbit/s, but the data move in the form of bursts, with silence between them.

The field of telecommunications has become more complicated with the widespread use of data transfer systems based on mobile wireless stations. In view of data transfer, they belong to the group of telephone services, but particularly in digital cellular radio networks, it is also possible to offer many services which have been difficult or impossible to implement in PSTN networks (Public Switched Telephone Networks).

Because the main criteria on which the user estimates new data transfer systems are ease of operation, level of services and low operating costs, it is clear that many overlapping systems, each of which only implements part of the data transfer tasks required, do not represent an ideal solution. In the development of data transfer, the objective should be to harmonize devices and systems so as to improve the level of service, reduce overlapping and to increase capacity. The options available should include both fast data transfer in the form of bursts for large amounts of data, and temporally continuing, high quality telephone connection for communication between people. In order to shed light on the background of the present invention, certain prior art solutions regarding integration of data transfer and improvement of services are examined at first. In telephone communications, the most advanced modem technology is represented by digital cellular radio systems, in which a small, low-weight mobile station (mobile phone) can be carried along and used for establishing a telephone connection within the coverage area of the system. Mobility and the related localization and control of the mobile stations by the system, together with the advantages of digital signal processing, such as advanced message services and good encryption and identification possibilities make cellular radio systems a strong candidate to become the primary telephone communication system in the future, likely to spread all over the world in the course of time. In this application, the GSM system (Groupe Spéciale Mobile), which is common particularly in Europe, is used as an example of a cellular radio system, but in view of the invention, it is not essential which system is concerned.

In relatively small areas, where there are many users and dense communications, cellular radio systems often encounter problems of capacity. Examples of this are city centers, office buildings and airports. In addition, in office environments where data transfer between data terminals close to each other is frequently required, it is not practical to route internal communications via an external system. A common solution has beed to build a wired local area network for high capacity data transfer, for example a network according to the registered trademarks Ethernet® or Token Ring®, to which the data terminals are connected by means of a special network adapter, and in which packet switched data transfer protocols typical of each network are used for the packaging and transfer of data. The local area networks are often combined into larger entities by arranging the connections between them either by way of a general telephone network such as PSTN (Public Switched Telephone Network) or ISDN (Integrated Services Digital Network) or by way of faster networks developed especially for this purpose, such as the ATM (Asynchronous Transfer Mode) networks.

Nevertheless, local area networks of the wired type are inflexible in view of expansion and adaptation. One alternative solution has been RLAN, Radio Local Area Network, which is known from many embodiments. For example, the patent application WO 93/07684 (Sixtel S.P.A.) presents a wireless local area network (RLAN), in which each user station participating in network communications is associated with a radio adapter and radio transmitter/receiver, which has a radio connection to a certain number of fixed base stations (radio bases). The application suggests an interface in accordance with the DECT standard (Digital European Cordless Telephone) as the radio interface. In the construction according to said application, the base stations are connected by wires to a concentrator, from which there can be a further connection to an ordinary wired local area network.

Other solutions for wireless local area networks are known from the following patent applications:

* EP 483 545 (IBM)

A method for improving the utilization of frequencies in a system in which several base stations are connected to a wired local area network. In order to prevent overlapping transmissions, the base stations are arranged in a daisy chain, and a circulating token controls the order of transmission.

* EP 539 737 (IBM)

An improved version of the previous method.

* EP 605 957 (NCR International)

A wireless local area network, in which the mobile stations can switch to another base station. The base stations are connected to each other and to the server that controls the operation of the system by means of a wired local area network, and mobility messages that describe the movement of the mobile stations cause rearrangement in the lists which are kept by the base stations and the server for routing the connections.

* EP 605 989 (NCR International)

A version of the previous method, in which the decision on switching the mobile station to another base station is based on beacon messages sent by the base stations and on measuring their level in the data terminals.

It is a common feature of the patent applications described above that in the systems presented by them, the data terminals communicate with the base stations only, and radio connections between the data terminals are not used. A network of this kind is only a moderate improvement compared to ordinary wired local area networks, because the wiring of the base stations is nearly as inflexible as wiring that extends up to the data terminals. A different solution, called HIPERLAN (HIgh PErformance Radio Local Area Network), is known from the ETSI (European Telecommunications Standards Institute) publications ETR069, ETSI TC-RES, HIPERLAN Services and Facilities document: "Radio Equipment and Systems (RES) HIPERLAN Services and facilities/System Definition Document", February 1993. In this solution, the network consists of nodes, each of which is constituted by a radio transmitter/receiver, which can communicate with other corresponding devices. In practice, the properties required from a node include radio operations, signal handling capability and memory and thus its natural embodiment is a computer in which the radio components are incorporated. for example in the form of a PCMCIA (Personal Computer Memory Card International Association) card.

HIPERLAN is intended for arranging internal data transfer in an office environment, and its objective is to combine the high capacity of an ordinary LAN with the flexibility of wireless systems. The theoretical range of the radio equipment in each node is a maximum of 800 meters at a limited data transfer rate and about 50 meters at the full 20 Mbit/s transfer rate. There is no fixed structure, but the users can form an ad hoc network for an application when required. The nodes can move and they can be switched on and off. The publications also define special protocol converter nodes, by means of which the HIPERLAN network can connect to external networks of the standard ISO 8802, which include, among others, ordinary wired local area networks and so called city networks (MAN, Metropolitan Area Networks). Protocol conversions take place at the MAC or DLC interfaces (Media Access Control, Data Link Control), which are telecommunication concepts generally known to persons skilled in the art.

Because HIPERLAN is a local network solution, which operates only in a limited area, it is as such not a solution to the problem of extensive integration of data transfer services stated previously in this document. However, it is an essential component in the present invention, and its technical implementation will be explained in more detail in connection with the description of the invention.

One network which offers worldwide, fast data transfer service is Internet, a freely formed network based on packet switched transfer between computers connected to the network. Nevertheless, Internet cannot be used as a component of an integrated data transfer system of the future in its present form, because the addresses of the nodes or data terminals connected to it are defined in a hierarchical tree structure, in which a node is always situated under another node and the data coming to a node are routed via nodes that are above it in the hierarchy. Because it is an essential requirement of the integrated data transfer system of the future that the data terminals are mobile, a node should be able to change place from one branch of the routing tree to another. Fixed Internet addresses, like those used presently, do not support changing the place of nodes, but a new Internet protocol is being planned, and the functions defined in it enable a node to move from one branch of the routing tree to another, although its Internet Protocol Address (IP Address) does not change. The new protocol is called Mobile IP, and it is known from the publication Internet DRAFT, "IP Mobility Support", Internet Engineering Task Force (IETF) Network Working Group, May 1994.

SUMMARY OF THE INVENTION

It is an objective of the present invention to provide a data transfer system in which the advantages of the previous systems are combined and their drawbacks avoided. In addition, it is an objective of the invention to provide a telecommunication system, which supports all telecommunication from a mobile station regardless of its location and speed (at least up to 250 km/h) and time of day. An objective of the invention is also to reduce the need for overlapping data transfer networks, but at the same time also to maintain or to improve the level of service offered to the user. Furthermore, it is an objective of the invention to provide a data transfer system of the kind described above, which offers both asynchronous and temporally continous services. The data transfer system being provided should also offer flexible implementation and low costs.

The objectives of the invention can be realized by means of an integrated system which has a wide area of operation. Its provision of telephone services is based on a cellular radio system, preferably the GSM system, and its provision of data transfer services is based on a worldwide computer network, preferably the Internet, equipped with a routing protocol which supports the mobility of data terminals, and in which there are, in areas with dense communications. dynamically changing radio LANs, preferably operating on the HIPERLAN principle, connected to the cellular radio network and the computer network The telecommunication system according to the invention, comprising a general cellular radio network and a multi-user radio local area network, is characterized in that said radio local area network has a gateway for establishing a data transfer connection between said radio local area network and the switching centre of said general cellular radio network and for carrying out the required protocol conversions between the data transfer protocols used in said radio local area network and the data transfer protocols used in said general cellular radio network.

The invention also relates to a radio local area network, which is to be integrated into the general cellular radio network in the way described in the invention. The radio local area network according to the invention is characterized in that it has a gateway for establishing a data transfer connection between said radio local area network and said switching centre of the general cellular radio network and for carrying out the required protocol conversions between the data transfer protocols used in said radio local area network and the data transfer protocols used in said general cellular radio network.

In addition, the invention relates to a gateway computer, which is used to establish a data transfer connection between the radio local area network and the switching centre of the general cellular radio network. The gateway computer according to the invention is characterized in that it comprises a radio transmitter/receiver for offering a radio interface for the data terminals which are located in said radio local area network, a line transmitter/receiver for offering an interface to the switching centre of said general cellular radio network, which interface is essentially similar to the interface between the switching centre and the base station controller defined in said general cellular radio network, and means for carrying out the required protocol conversions between the data transfer protocols used in said radio local area network and data transfer protocols used in said general cellular radio network.

Furthermore, the invention relates to a method by means of which a data transfer connection is established between two data terminals in the system described above. The method according to the invention is characterized in that it comprises the following operations:

the first data terminal, which starts the communication, establishes a connection with the first gateway computer, which controls the operation of the first radio local area network and notifies that it wants to establish a data transfer connection with a certain second data terminal, and also informs whether it wants a telephone connection or a slow or fast data connection, said first gateway computer determines, on the basis of information saved in its storage media, whether the said second data terminal is or is not in the same radio local area network as said first data terminal, if said first and second data terminal are in the same radio local area network, said first gateway computer routes the connection between them using the nodes which are in the first radio local area network, if said first and second data terminal are not in the same radio local area network, and said first data terminal has informed that it wants a telephone connection or a slow data connection, said first gateway computer directs the connection request to a certain switching centre of the general cellular radio system, if said first and second data terminal are not in the same radio local area network, and said first data terminal has informed that it wants a fast data connection, said first gateway computer directs the connection request via a certain other gateway computer to a certain general network intended for data transfer between computers, and if said first and second data terminal are not in the same radio local area network, but said second data terminal is in a certain other radio local area network, from which there is a connection to said first radio local area network by means of a certain third gateway computer and a certain general, wired network intended for data transfer between home and office data terminals, said first gateway computer directs the connection request by means of said third gateway computer and said general, wired network intended for data transfer between home and office data terminals to said second radio local area network.

It was stated above that cellular radio systems are found to have the best properties for building a telephone system which offers extensive mobility and advanced telephone services. The invention is based on the realization that in a system like this, it is possible to build "islands" of the HIPERLAN type, within which a data transfer protocol typical of radio LANs is used, and wherein the control of the mobility of data terminals is at the same level as in an extensive cellular radio system. The data terminals can move within the radio LAN, whereby the radio LAN in question follows their movement and reroutes the connections if required, even globally, in which case the general cellular radio network is responsible for the mobility and routing services between the HIPERLAN islands. Data transfer from one radio LAN to another takes place through the general cellular radio network, and the connection between the radio LAN and the cellular radio network is implemented by means of a gateway computer, which also carries out the required protocol conversions. In the following description of the invention, the GSM system is used as an example of a cellular radio system. However, the invention is not limited to GSM applications only, but any other corresponding digital system, such as DCS 1800 or US-TDMA, can be used as the wide-coverage cellular radio system.

The invention also includes the realization that a worldwide computer network, such as Internet, can be used as the basis of data transfer connections in a data transfer system according to the invention, provided that the addresses of the computers or nodes connecting to it and the routing protocol between them are such that they allow the nodes to move without losing the uniqueness of their identity and the possibility of routing to other parts of the network. The connection between Internet and a dynamically changing radio network of the HIPERLAN type, which functions as a LAN also in connection with data transfer, is implemented by means of a gateway computer, which can be either the same gateway computer which handles the connections between the radio local area network and the cellular radio network, or a different one.

In the preferred embodiment of the invention, local data transfer is arranged in different ways depending on the environment. Some environments, such as offices, business buildings, hospitals or airports, have dense communications, whereas in other environments, such as homes, small offices or residential areas, communication systems are used less frequently. According to this division, the preferred embodiment of the invention includes applications of the first and the second category, respectively. The definition of the categories and their technical implementation will be reverted to hereinafter.

BRIEF DESCRIPTION OF THE DRAWING

In the following, the invention will be described in more detail, with reference to the preferred embodiments provided by way of example and the accompanying drawings, in which.

The same reference numbers and markings are used in the figures for corresponding parts.

DETAILED DESCRIPTION OF THE INVENTION

Figure 1:
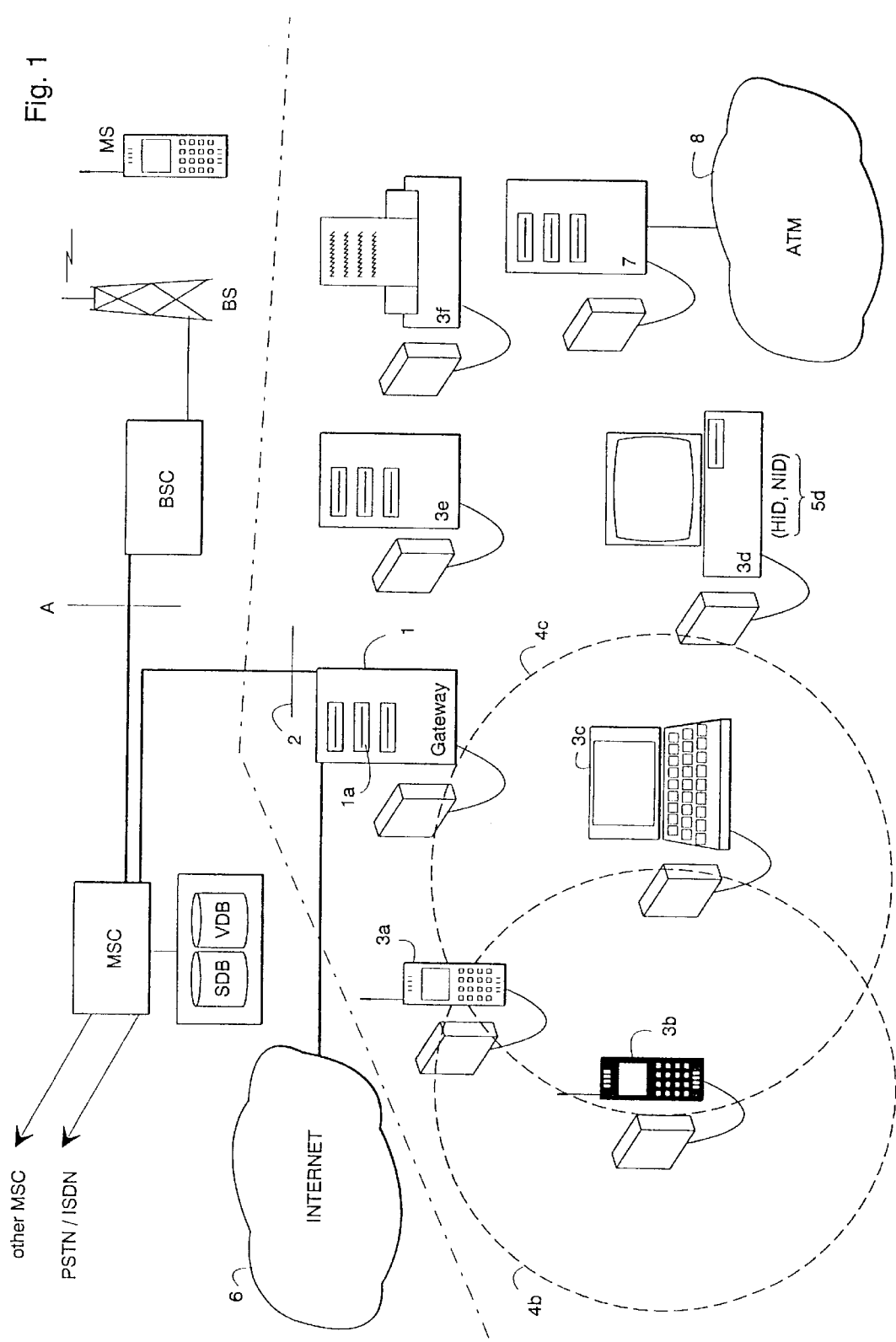
FIG. 1 shows a data transfer system according to the invention, particularly an application of the first category.

FIG. 1 shows a data transfer system particularly intended for an office environment, in which case it is an application of the first category. The components which are part of the office environment are drawn in the figure below the dotted broken line. In order to illustrate the operation of the system, there is first a description of components which are not part of the office environment, but which are known as components of standardized cellular radio systems.

The operational core of a cellular radio system is constituted by Mobile Switching Centres (MSC), associated with databases SDB and VDB (Subscriber Database and Visitor DataBase) for saving and using information related to the location and status of the data terminals. Under one Mobile Switching Centre there are many Base Station Controllers (BSC), each of which controls one or more Base Stations (BS). In the GSM system, the standardised interface between the MSC and the BSC is called the A-interface.

The data terminal of the cellular radio system, Mobile Station (MS), has a radio connection to the Base Station (BS), whereby the base station transmits the location and status data of the data terminal in question to the data base media SDB or VDB of the switching centre MSC, depending on whether the data terminal is one of the Subscribers in the area or is there as a Visitor. The Mobile Switching Centre uses the information saved in the databases for guiding the paging messages when attempts are made to reach a certain data terminal. The base stations constitute Location Areas (LA, not shown in the Figure), which represent the accuracy with which the location of one data terminal can be defined. When the Mobile Station moves from one location area to another, its location data are updated and the connection from the MS to the switching centre MSC is assigned to the base station of the new location area by means of a handover operation.

The following is a description of the parts of FIG. 1, which are located in an office environment and constitute an entity according to the invention. Within the office, all data transfer takes place in a radio local area network, the nodes of which are stations 3a, 3b, 3c, 3d, 3e, 3f. The gateway computer 1 shown in the Figure, which is also one of the nodes of the radio local area network, operates as a connecting link between the radio local area network and the Mobile Switching Centre. The interface 2 between the Gateway computer 1 and the MSC complies with the same A-interface standard, which defines the communications between the base station controllers BSC and the mobile switching centre MSC, and thus the gateway computer 1 appears like any BSC to the switching centre. Alternatively, the interface 2 between the gateway computer 1 and the mobile switching centre MSC can be implemented as a DSS. 1+ interface when the standardization of this new interface is completed. In the new interface specification, certain protocol conversion tasks are changed over from the mobile phone switching centre MSC to the gateway computer 1. All telecommunication operations taking place under the gateway computer 1 appear to the switching centre to take place in a certain location area corresponding to the office in question. It can also be said that systems operating under the gateway computer constitute one Base Station Subsystem from the switching centre point of view.

Each node 3a–3f of the radio local area network has a certain area of coverage 4b, 4c, the extent of which depends on the power and antenna available and the attenuating structures around it. For clarity, FIG. 1 shows only the coverage areas 4b, 4c of two nodes 3b, 3c, but it is clear for a person skilled in the art that each node is surrounded by an area of coverage, which is similar in principle. Direct connection from a node is possible only to those other nodes which are located within the area of coverage; for example, from node 3b to nodes 3a and 3c. In order that two nodes would be able to operate in the same radio local area network, there must be an unbroken chain of nodes between them, located in each other's areas of coverage and thus able to communicate with each other. Unlike in an ordinary local area network, the nodes 3a–3f of the radio local area network, or the mobile stations, do not have a fixed logical position, nor a fixed address. Thus one essential component for forming a network is the fact that routing, or arranging connections between devices that are part of the network can be carried out on the basis of the situation in the network at each moment in a way which has been described in the previously mentioned publications dealing with the HIPERLAN network. The nodes 3a–3f can be moved, and they can be switched on and off.

An address pair, tuple, has been defined for each node 3a–3f of the radio local area network. The tuple consists of two identifications, HID (Hiperlan IDentification) and NID (Node IDentification). For the sake of clarity, only the tuple 5d of one node 3d is shown in the Figure. The tuples are used to define the network owned and controlled by the users, which is called the PVR (Private Virtual Radio) subnetwork. In the definition, the HID identification, which is the same for all the nodes 3a–3f of the radio local area network, determines which logical subset of all data terminals with communication capability is part of the PVR subnetwork in question. The NID identification, which is unique to each node, distinguishes between the members of the logical subset concerned.

When the message being transmitted in the radio local area network is routed towards the node which is its destination, the Message Protocol Data Unit (MPDU), not shown in the figure, which belongs to the address portion of the message, contains the following information:

Hop Destination Address, the Hiperlan address or tuple of the next following node, Hop Source Address, the Hiperlan address or tuple of the next previous node, the Final Destination Address, the Hiperlan address or tuple of the node to which the message is intended, Original Source Address, the Hiperlan address or tuple of the node from which the message comes from, Final Destination Address in the MAC format, the address according to the standard ISO8802 of the node to which the message is intended, Original Source Address in the MAC format, the address according to the standard ISO8802 of the node from which the message comes from.

It is required from the node 3a–3f that it can interpret the addresses in accordance with the standard ISO8802 of the nearest adjacent nodes as tuples, or Hiperlan addresses. The HIPERLAN network formed by the nodes 3a–3f supports synchronous and temporally continuous data transfer as well as asynchronous data transfer in the form of bursts. In synchronous data transfer, which is used preferably to transfer voice connections between mobile stations that function as data terminals, the data transfer rates are 64 to 2048 kbit/s. In asynchronous data transfer, which is used to transfer data between computers, the maximum transfer rate is approx. 20 Mbit/s in good circumstances. The following table contains the most important HIPERLAN parameters.

| Parameter | Value or description |
| --- | --- |
| Frequency bands | Frequency bands in the areas 5.2 GHz and 17.1 GHz |
| Data transfer rate | In asynchronous transfer: <20 Mbit/s In synchronous transfer: 64–2048 kbit/s (at 64 kit/s intervals) |
| Latency | In asynchronous transfer: <1 ms (at 30% load) In synchronous transfer: start of connection <3 s |
| Linear range | 50 m (20 Mbit/s)–800 m (1 Mbit/s) |
| Power consumption | A few hundreds of mW |
| Modulation method | GMSK (Gaussian Minimum Shift Keying) |

In order that a data terminal or node 3a–3f, which is part of the system according to the invention, might be a Mobile Node that can be recognized by the Internet network 6, certain Home Agent and Foreign Agent functions are required from the data transfer system. The Home Agent function means that a certain computer which is part of the radio local area network, preferably the same gateway computer 1, which manages the data transfer connections of the radio local network to the Internet network 6, can tell which nodes of the radio local area network are defined as mobile and which is the current routing to a mobile node when it is somewhere else than its home network. On the basis of its information the Home Agent computer routes the messages sent to the mobile node when the node is outside its home network. Correspondingly, the Foreign Agent computer, which in the arrangement according to the invention is preferably the same as the Home Agent computer or the gateway computer 1, can tell which nodes that are not part of the radio local area network have come to the network from somewhere else to "visit" and how the messages are routed to them. The operation of the Foreign Agent computer can be chosen to be such that some restrictions are set as to how the nodes from outside can be used in the internal radio local area network of an office.

Users who have a data terminal 3a–3f or node of the system according to the invention, can move with the terminal anywhere in the area of the office, or the first category application. When the data terminal changes place, the radio local area network updates its configuration in a manner such that the data terminal, preferably a portable computer 3c with suitable radio equipment, is continuously within the range of the network operations which require data transfer between the data terminals.

In the following, an application of the second category will be described with reference to FIG. 2. The characteristic features of an application of the second category include a relatively small communication load as compared to the applications of the first category, but the mobility requirements of data terminals are the same. A typical application environment is the home, where telephone connections are used, and from where one can also occasionally establish a data transfer connection to the computer systems of one's place of work.

A separate, small HIPERLAN network is formed in the second category application environment. In this network, the radio interface between the nodes 10, 3g and 3h is similar to that of the first category application. A similar radio interface guarantees that the same data terminals 3g, 3h can be used in applications of both the first and the second category, and that in the home environment it is also possible occasionally to carry out tasks that require high transfer speed. The home environment has its own gateway computer 10, which is the only fixed node of the environment and from which there is a connection to the outside world via a known data transfer network 8. Other nodes of the small HIPERLAN network of the home environment (HE) are mobile data terminals 3g, 3h, which can move freely to the network and away from it. Particularly advantageously the home-gateway 10 can be connected to some existing data transfer connection in order that no new installations overlapping with the existing networks are needed. Suitable connections include those of Public Switched Telephone Network (PSTN), Integrated Services Digital Network (ISDN), Cable Television (CATV) or ATM network. It can also use a connection providing access to more than one network, in which case the user can, in the preferred embodiment, select the network which is cheapest at the time or otherwise the most suitable for a certain purpose.

Figure 2:
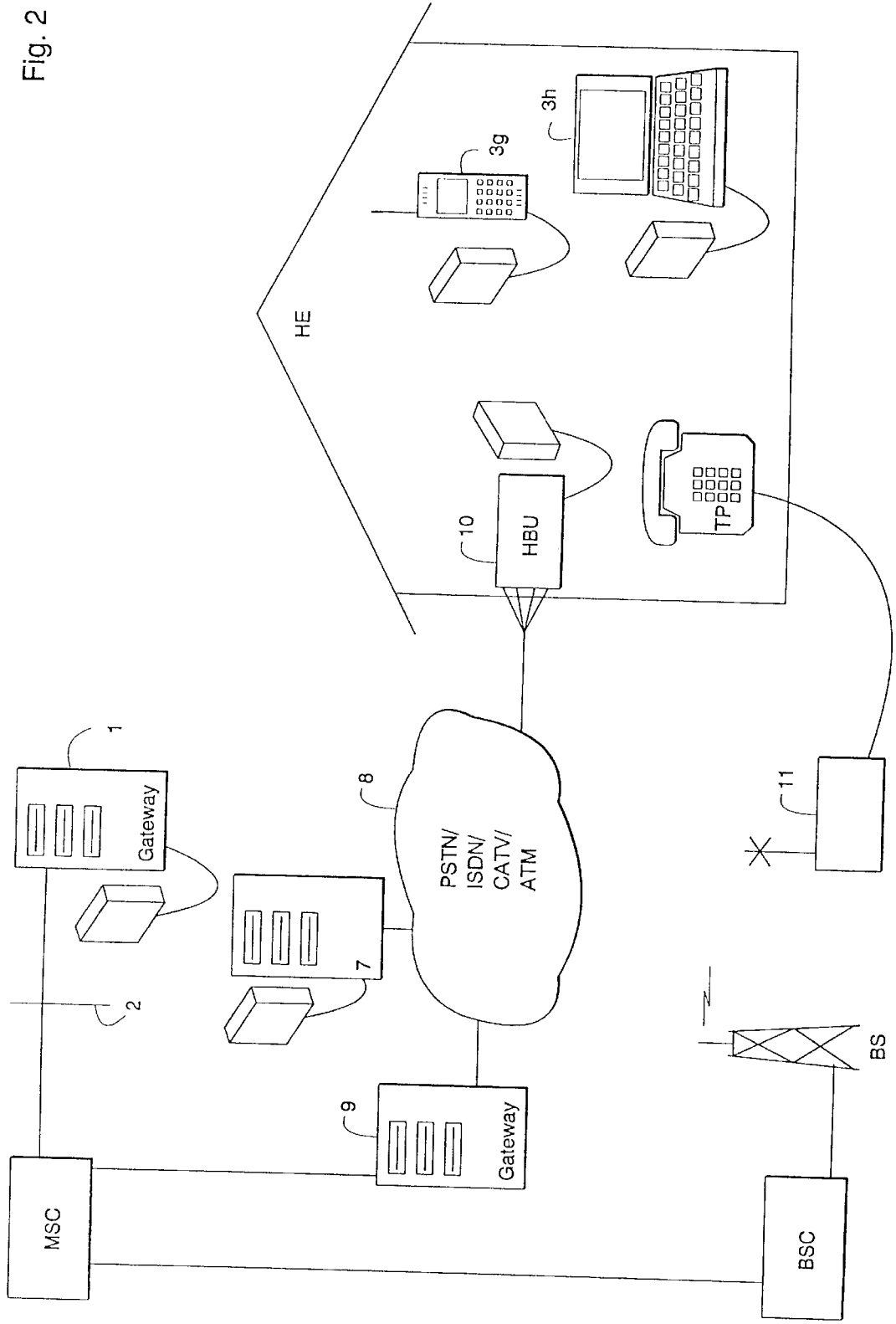
FIG. 2 shows a data transfer system according to the invention, particularly an application of the second category.

For establishing a connection from the home environment via the home-gateway 10 and the general data transfer network 8, shown in FIG. 2 but not specified, to the office environment or the first category application it is required that the latter comprises a gateway computer 7, which manages the required protocol conversions. It can be the same computer as the gateway computer 1 of the office environment, or a different one. In addition, from the home environment it is possible to connect via the general data transfer network to the switching centre of the general cellular network, provided that there is a gateway computer 9 between them. In the home environment HE there can also be ordinary data terminals TP of the PSTN telephone network, from which data terminals there is a wired connection either to an ordinary PSTN network (not shown) or, according to FIG. 2, to a gateway 11, which has a radio connection to the nearest base station BS of a cellular radio system and via the BS to the cellular radio system in question. In all connections coming to the home environment, it is preferable to use the existing wired connections.

In the following, the requirements and technical implementation of the components which are part of the data transfer system will be described in more detail. In view of the invention, the most important system component is the gateway computer 1. Only the gateway computer of the first category application will be dealt with here, but for the most part the same also applies to the fixed node or home-gateway 10 of the second category application. For the sake of clarity, telephone communications and data communications will be dealt with separately. In the embodiments of the invention, these operations can all be centralized in the same computer, or they can be divided between two integrated computers in a manner such that, for example, one of them handles telephone communications and the other one handles data communications.

The gateway computer 1 must operate as a gateway between two very different networks, namely the HIPERLAN network and the cellular radio network (GSM network in the example). With regard to the mobile switching Centre MSC of the cellular radio network, it operates like a base station controller BSC, and thus the interface 2 between the gateway computer 1 and the mobile switching centre MSC is similar to the A-interface defined in the GSM standard. For data transfer taking place through the HIPERLAN network, information complying with the GSM standards must be encapsulated to correspond to the data transfer format of the radio local area network. Because the data terminals are designed to be able to operate outside the office environment as ordinary data terminals of the general cellular system, connected to the base stations BS in accordance with the GSM standards, the encapsulation to the format required by the radio local area network must be done transparently with regard to the GSM system. This means that the data transfer frames in accordance with the GSM standards can be decoded from the transfer format required by the radio local area network, remaining unchanged, whereby the GSM component of the data terminal (not shown in the figure) and the GSM mobile switching centre MSC need not know that the data to be transferred has been in a different transfer format.

Figure 3:
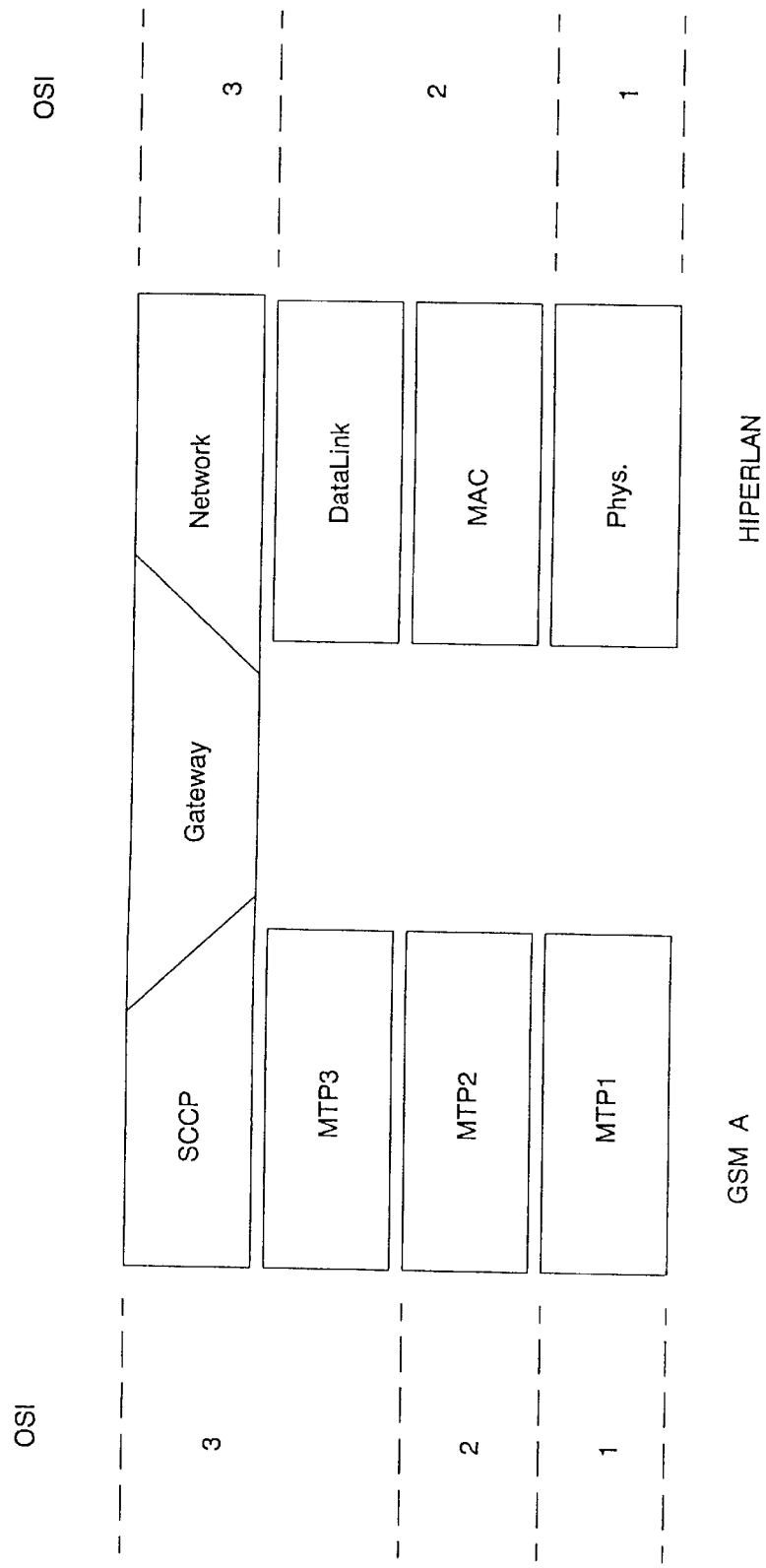
FIG. 3 shows protocol conversions in a gateway computer, which is a part of the system according to the invention.

FIG. 3 illustrates the protocol conversions which must be carried out in a gateway computer. In the A-interface defined by the GSM standards, the GSM A, which is used between the gateway computer 1 and the mobile switching centre MSC, has three protocol levels, which are called MTP levels MTP1, MTP2 and MTP3 (Message Transfer Protocol) and a system level SCCP (Signal Connection Control Part), which form three OSI levels (Open System Interconnection architecture) in accordance with FIG. 3. The protocol levels MTP1, MTP2 and MTP3 contain various specifications concerning the handling of data to be transferred, for example, the arrangement of data into frames and error correction operations. More detailed descriptions of the contents of the different levels are provided, for example, in the book by Michel Mouly and Marie-Bernadette Pautet: "The GSM System for Mobile Communications", published by the authors, Palaiseau/France 1992, ISBN 2-9507190-0-7. The corresponding levels on the HIPERLAN radio interface of the radio local area network are the physical level Phys, the MAC level (Media Access Control) and the DataLink level. These are described in more detail in the publications ETR069, ETSI TC-RES, HIPERLAN Services and Facilities document: "Radio Equipment and Systems (RES) HIPERLAN Services and facilities/System Definition Document", February 1993. On the HIPERLAN side, the system level is constituted by the network. Conversions between protocols take place preferably as programmable processes in the gateway computer, and the technique used in their implementation is known to a person skilled in the art.

In order to implement fast data transfer, there must be a connection from the radio local area network to a suitable general data transfer network, preferably the Internet network 6. This connection can be handled by the same gateway computer 1 as the connection to the general cellular radio network, or there can be a separate gateway computer for it. This connection requires its own protocol conversion operations, the detailed implementation of which depends on the standards of the general data transfer network being used at the time, but which are normally most advantageously carried out as programmable processes run in the computer.

In addition to the protocol conversions described above, the gateway computer 1 or a corresponding node, which has a fixed location in the radio local area network, must deal with the mobility management of the mobile nodes 3a–3f and the routing of calls in connection with it. In the direction of the Mobile Switching Centre, the gateway computer 1 emulates the BSS management messages, which are known as such. Thus the situation from the general cellular system point of view is such that the mobile phones and other corresponding data terminals within the radio local area network are located in a Base Station Subsystem controlled by the gateway computer, and calls to the data terminals are directed from the mobile switching centre MSC to the gateway computer 1, which transmits them forward in the radio local area network. Changes of network configuration, which take place within the radio local area network due to the moving of the data terminals 3a–3f in relation to each other, are managed by the gateway computer 1 on its own without sending any messages about the changes to the mobile switching centre MSC, so that the MSC need not be loaded with unnecessary communications concerning complicated radio local area networks. In order to implement mobility management, the gateway computer 1 must have storage media 1a, the arrangement and use of which correspond to the subscriber and visitor data bases SDB and VDB of the mobile switching centre.

In view of the Internet network, the gateway computer 1 or a corresponding node having a fixed location in the radio local area network, must handle the previously mentioned home and foreign agent operations, the purpose of which is to control the mobile Internet nodes, which are in the radio local area networks either as registered subscribers or visitors. These operations are programmable processes, and they deal with the Internet addresses of nodes, saved in the storage media 1a of the gateway computer 1.

As a summary, the following operations are required from the gateway computer 1 or several integrated control computers of the same radio local area network:

HIPERLAN—GSM protocol conversion and the implementation of interfaces

HIPERLAN—general wired data transfer network protocol conversion and the implementation of interfaces emulation of the base station subsystem and control of the mobility of nodes within the radio local area network home and foreign agent operations.

In addition, in the preferred embodiment the gateway computer 1 offers similar intelligent telephone services within the HIPERLAN network as are offered by the current digital switching centres of PSTN telephone systems and the switching centres of cellular radio systems, and are known as such. Examples of such services include call transfer, shortcut dialling and delivery of messages.

Figure 5:
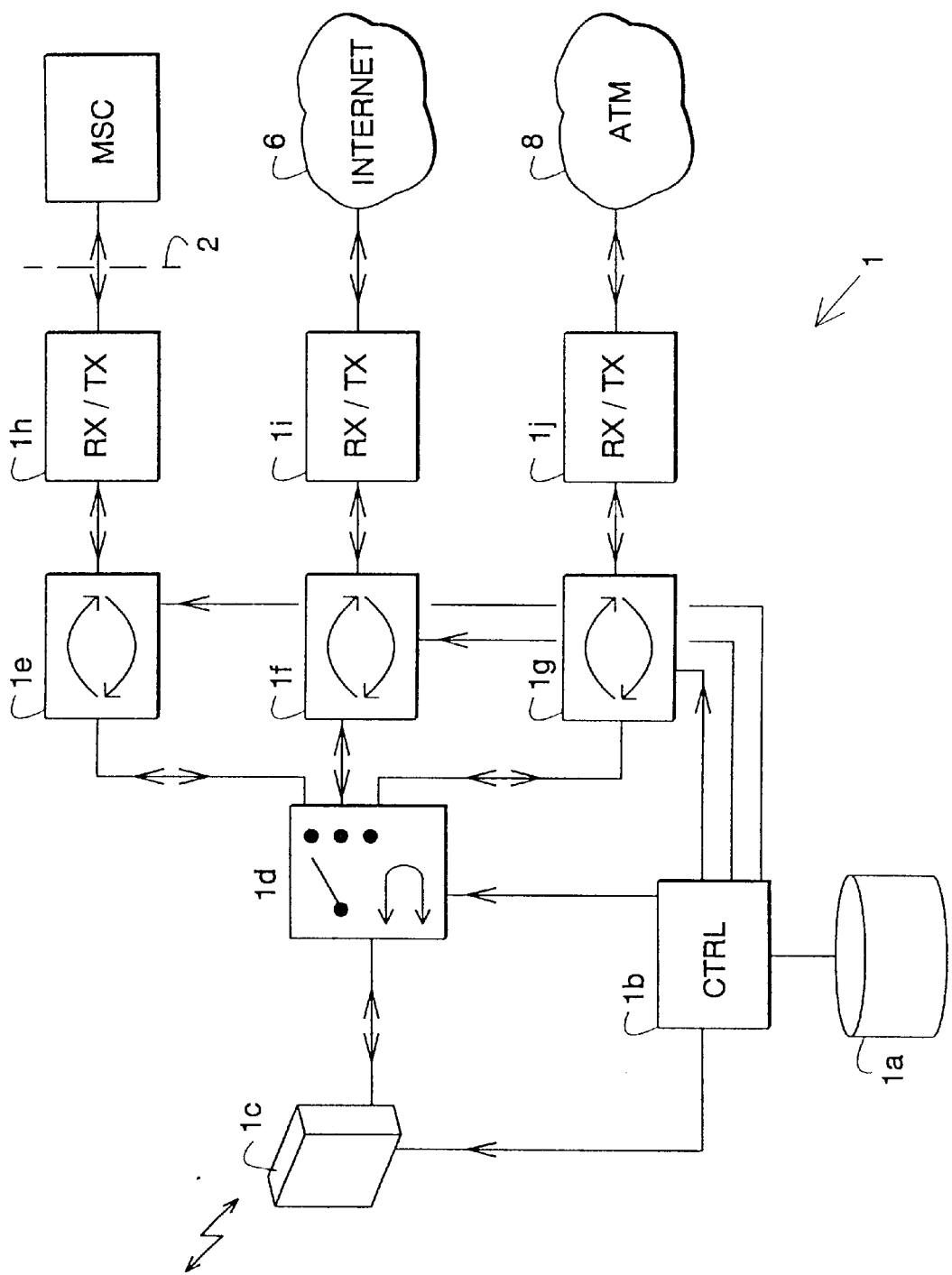
FIG. 5 shows a flow diagram of a gateway computer, which can be used in a system according to the invention.

FIG. 5 shows a schematic block diagram, which illustrates the structure of the gateway computer 1. Its operation is controlled by the control unit 1b, the program of which and other online information of e.g. node addresses and routing is saved in storage media 1a. The radio transmitter/receiver equipment 1c constitute a radio interface in the HIPERLAN network. Connection from the HIPERLAN network to the mobile switching centre MSC of the general cellular network, the Internet network 6 or the wired data transfer network 8 is selected in the switching portion 1d. If the connection takes place between two data terminals within the radio local area network, the switching portion 1d does not connect it to any external network. The protocol conversion operations corresponding to different networks take place in blocks 1e, 1f and 1g, and line transmitter/receiver devices, which constitute a physical connection with other networks, are marked with reference numbers 1h, 1i and 1j.

Figure 4:
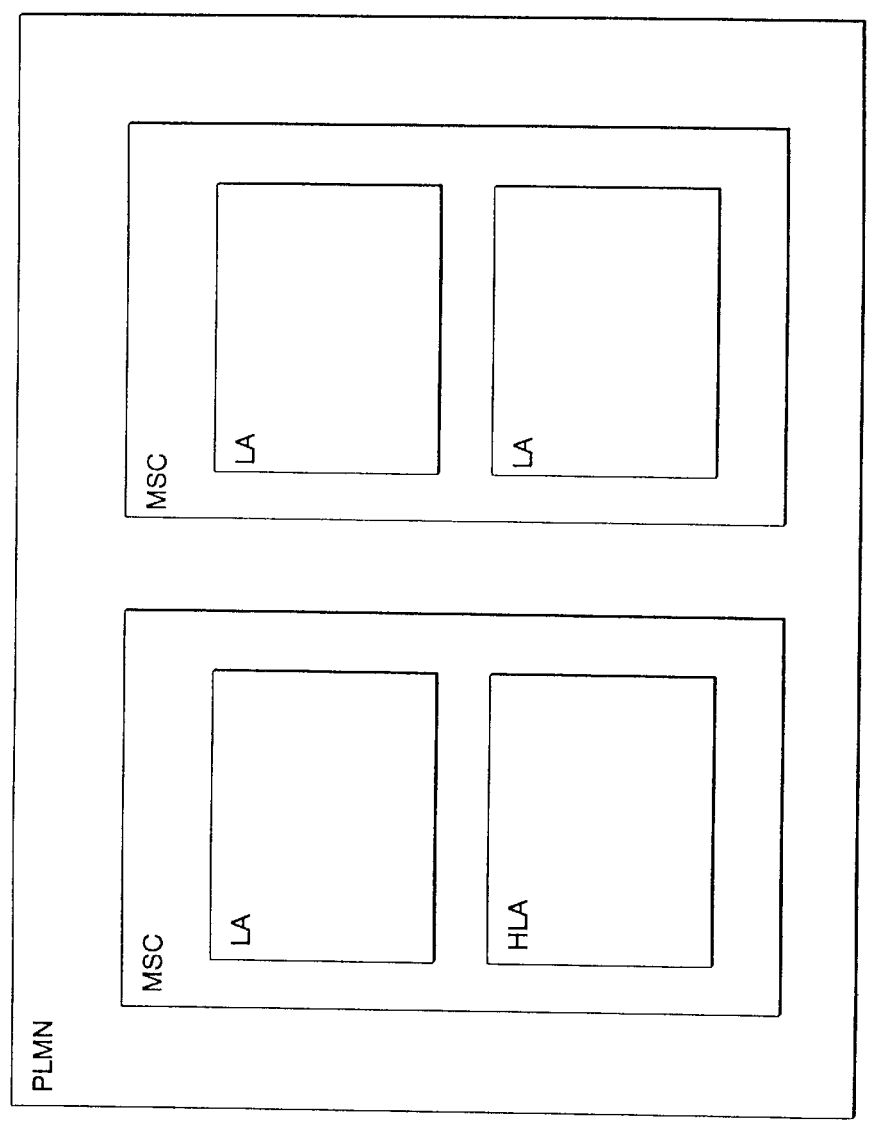
FIG. 4 shows the relations between certain areal specifications in a telecommunication system according to the invention.

In the following, the location and mobility control, which is an essential part of all telecommunication systems using mobile data terminals, will be described in more detail. FIG. 4 illustrates how the concepts PLMN (Public Land Mobile Network) area, MSC (Mobile Switching Centre) area, LA (Location Area) and HLA (Home Location Area) are related to each other in the previously known manner. The user is a registered subscriber of the PLMN area of the network operator, from whom the user interface concerned has been bought or leased. Control of this area is divided between many mobile switching centres MSC, and each MSC is further divided into location areas LA. One of these location areas is usually defined as the home location area HLC of the user, and while being in the HLC, the user has certain advantages, such as lower telephone tariffs.

In the arrangement according to the invention, the radio local area network constitutes at least one location area LA, which can be defined as the home location area HLA of the data terminals located in it. Generally, the size of location areas is determined on the basis of the capacity and power requirements of the system. Because the location of each data terminal is defined in the system with the accuracy of the location area, the size of the areas affects particularly the volume of the communications required for updating the locations of the mobile stations and for transmitting the paging message to a certain data terminal. If the office constitutes one location area, a paging message to any data terminal within the office area must be sent in the whole radio local area network, in which case all the mobile stations also interprete all paging messages. An opposite alternative is that each node constitutes its own location area, in which case a call to a certain data terminal will be sent in the radio local area network to one node only. In the latter alternative, changes have to be made frequently in the location data bases maintained by the gateway unit, as the users walk around the office carrying the data terminal.

However, in view of reducing the power consumption of the data terminals, sending the paging messages in one node only is a better alternative, because then one data terminal needs to interpret only a small number of paging messages.

The location areas can also be defined as a compromise of two of the extreme alternatives presented above, in which case each location area comprises a few nodes. If the company has several offices in different locations, by an agreement to be concluded with the network operator it is possible to give the employees of the company certain advantages, which are in force in the location areas constituted by all the offices or some of them.

Controlling the mobility of the users and their data terminals takes place in the system according to the invention in a manner such that the gateway computer 1 follows the movements within the radio local area network, and the databases of the mobile switching centre MSC only have the information that the data terminal is within the area controlled by a certain gateway computer. When a paging message comes to the data terminal, the mobile switching centre MSC directs it to the gateway computer 1, which further directs it to be sent to the nodes which constitute the location area where the data terminal in question is located according to the location database of the gateway computer 1. If the radio local area network constitutes only one location area, the gateway computer 1 routes the call to the right node on the basis of location and connection information saved in its storage media 1a.

Data security, which means checking the rights of users and protecting privacy by encryption is taken care of in the system according to the invention in the same previously known manner which is used in a general cellular radio system, a GSM system in this exemplary embodiment. In the invoicing of telephone calls, there are many alternatives by which a company using a system according to the invention can, for example, arrange that internal telephone calls in the office are free of charge and only outgoing calls are paid for. In addition to actual telephone calls, invoicing can also be based on the proportion of signalling which does not contain speech or transferrable data information, but, for example, updates of location information, which are handled through the general cellular network and thereby cause costs to the operator. In addition, invoicing can be proportioned to the level of service that the users want in a manner such that the cheapest level of service only includes only use in the home environment of a second category application created by means of the home-gateway, and the most expensive level includes an operation area covering the whole country in all suitable radio local area networks and in the general cellular radio network between them.

The following is a description of handover operations, or changing the routing of a telephone connection in use when the user with the data terminal moves so much that the original route is no more the best possible with regard to the quality of the connection. In the system according to the invention, the objective is to be able to perform these functions by means of the currently defined operations to as great an extent as possible. There are three different types of handover operations: under the same base station controller (Intra-BSC), between base station subsystems (Inter-BSS) and between switching centres (inter-MSC).

Because the gateway computer 1 in the system according to the invention corresponds to the base station controller BSC of an ordinary cellular radio system, it deals with all handover operations taking place within the office, that is, within its own base station subsystem (its own radio local area network). Decisions on changing the routing within the office are based on measurements, which the mobile stations make in accordance with previously known standards regulating their operation and from which information is transmitted to the gateway computer 1 in the same way as to the base station controller of an ordinary cellular radio system.

With regard to the invention, handover operations between the base station subsystems and between switching centres are similar in that in both cases the data terminal moves across the administrative border between the office communication system according to the invention and the general cellular radio system. In this case, the mobile switching centre MSC performs the handover operation in the previously known manner. If the system according to the invention is located in the coverage area of the general cellular radio system, there can arise a situation in which the data terminal does not move, but because of interference conditions, the quality of the connection would be better when transmitted through the general cellular radio network. In the preferred embodiment of the invention, in which the location area constituted by the office is used as the home location area of the data terminal, it is however preferable to transmit the connection through the system of the invention as long as the quality of the connection remains satisfactory. Correspondingly, if a connection has been handed over to the general cellular radio system, it is preferred to return to the system according to the invention as soon as the quality of the connection can be made satisfactory.

Because the HIPERLAN radio interface and the GSM interface are very different for example with regard to the speed of movement supported by them (GSM<250 km/h), HIPERLAN<36 km/h), switching from the radio local area network to the general cellular network or vice versa can cause delays, which are due to running the programmable processes used for the implementation of the interface in the data terminals and/or in the gateway computer 1. For this purpose, it is suggested that a concept of call re-establishment be defined. When the data terminal loses connection to another data terminal, the gateway computer 1 or the base station BS, it should be able soon to establish a substitutive connection via another node or base station of the general cellular system. The operation corresponds to the mobile-initiated handover defined in the DECT system.

The following is a description of mobile stations used in the data transfer system according to the invention. Because in the system according to the invention, the radio local area networks are formed particularly in areas with dense communications, it is very likely that they overlap with the coverage area of a general cellular radio network (for example, a GSM network). A user who has an ordinary GSM mobile station can use it normally without paying attention to the radio local area networks, the internal operation of which takes place on different frequencies than the GSM connections, and thus the invention does not force old users to upgrade their equipment.

The equipment best suited to be used in connection with the invention are new kind of integrated mobile stations which have radio equipment for operating both in the GSM system and in radio local area networks, so-called HIPERLAN islands. Radio equipment similar to those used in the current GSM phones are suitable for operating in the GSM system. The equipment required for the HIPERLAN operation are described, for example, in publications ETR069. ETSI TC-RES, HIPERLAN Services and Facilities document: "Radio Equipment and Systems (RES) HIPERLAN Services and facilities/System Definition Document", February 1993. Data terminals provided with two radio equipment can become, for example, the Personal Communicators of the future, by means of which users can transmit text, binary data, sound and image to each other. In the radio local area networks, it is also possible to use more economical data terminals, capable of HIPERLAN operations only, which can operate in the area of a certain radio local area network or networks, but not outside of them where GSM connections are required.

The invention provides an integrated form of data transfer, by means of which it is possible to transmit all services required from personal communication in the future. It combines the mobility and wide coverage of cellular radio networks and the high capacity of the Internet network between computers. In areas where fast movement (<250 km/h) is possible, users are offered services via the GSM network, and in offices and other areas with dense communications, where high-capacity data transfer is required, via radio local area networks. The invention eliminates the need to build overlapping, wired data transfer networks in office buildings, because all data transfer takes place locally via one network, which is also a wireless radio network, and so the users are not required to stay in one place with their data terminals. The mobility of the data terminals makes the system according to the invention flexible and advantageous in the long term, because there will be few new installations, and changes to the existing installations are rarely required.

What is claimed is:

1. A telecommunication system for transmitting data in electric form between data terminals, comprising:
    a general cellular radio network, which comprises a mobile switching centre MSC, base station controllers BSC and base stations BS, and
    a first multi-user radio local area network, which comprises data terminals provided with radio transmitter/receiver equipment, each of which constitutes a node of said first radio local area network and has a radio connection to at least one other node;
    wherein said first radio local area network also comprises a plurality of gateways including a first gateway for establishing a data transfer connection between said first radio local area network and the mobile switching centre MSC of a general cellular radio network and carrying out protocol conversions between data transfer protocols used in said first radio local area network and data transfer protocols used in said general cellular radio network; and
    means for selecting one of said gateways based on a desired speed of data transmission.

2. The telecommunication system according to claim 1, wherein said first radio local area network also comprises a second gateway for establishing a data transfer connection between said first radio local area network and a certain general network intended for data transfer between computers and for carrying out the required protocol conversions between the data transfer protocols used in the first radio local area network and the data transfer protocols used in said general network intended for data transfer between computers.

3. The telecommunication system according to claim 2, wherein said first gateway is essentially the same as said second gateway.

4. The telecommunication system according to claim 1, wherein said first gateway connects to said mobile switching centre MSC of the general cellular radio network at an interface, which is essentially similar to a further interface between the mobile switching centre MSC and one of said base station controllers BSC defined in said general cellular radio network.

5. The telecommunication system according to claim 1, further comprising a service device, which incorporates means for saving information about the nodes which at each time are located in said first radio local area network and about connections between them, and means for changing the saved information when one of the nodes of said first radio local area network moves in relation to the other nodes of said first radio local area network or moves out of said first radio local area network or comes to said first radio local area network, and means for routing data transfer connections from a data terminal of said first radio local area network to another essentially without any operation of said general cellular radio network.

6. The telecommunication system according to claim 5, wherein at least one of the nodes of said first radio local area network is defined as a mobile node of said general network intended for data transfer between computers, whereby it has a certain mobile node address in said general network intended for data transfer between computers, and said service device also comprises means for saving information on whether said node defined as a mobile node is in said first radio local area network or not, and what is the current routing of the data transfer connections to said node defined as a mobile node.

7. The telecommunication system according to claim 5, wherein said service device is essentially the same as said first gateway.

8. The telecommunication system according to claim 2, further comprising:
    a third gateway for arranging a data transfer connection between said first radio local area network and a certain general, wired network intended for data transfer between home and office data terminals and for carrying out the required protocol conversions between the data transfer protocols used in said first radio local area network and the data transfer protocols used in said general network intended for data transfer between home and office data terminals; and
    a fourth gateway for forming a limited, second radio local area network in an area comprising one or several rooms, which is located in a place other than said first radio local area network, and for carrying out the required protocol conversions between the data transfer protocols used in said second radio local area network and the data transfer protocols used in said general, wired network intended for data transfer between home and office data terminals, wherein the data transfer connection between said first and second radio local area network takes place via said third and fourth gateway, and between them via said general, wired network intended for data transfer between home and office data terminals.

9. The telecommunication system according to claim 8, wherein said third gateway is essentially the same as said first gateway or said second gateway.

10. A radio local area network for transmitting information in electric form between data terminals, comprising data terminals provided with radio transmitter/receiver equipment, each of which data terminals constitutes a node of said radio local area network and has a radio connection to at least one other node, wherein said local area network also comprises a first gateway for establishing a data transfer connection between said radio local area network and the mobile switching centre MSC of a general cellular radio network, and for carrying out protocol conversions between data transfer protocols used in said radio local area network and data transfer protocols used in said general cellular radio network.

11. The radio local area network according to claim 10, wherein it also comprises a second gateway for establishing a data transfer connection between said radio local area network and a certain general network intended for data transfer between computers, and for carrying out the required protocol conversions between the data transfer protocols used in said radio local area network and the data transfer protocols used in the general network intended for data transfer between computers.

12. The radio local area network according to claim 11, wherein said first gateway is essentially the same as said second gateway.

13. The radio local area network according to claim 10, further comprising a service device, which incorporates means for saving information about the nodes which at each time are located in said radio local area network and about connections between them, and means for changing the saved information when one of the nodes of said radio local area network moves in relation to the other nodes or moves out of the network or comes to the network, and means for routing data transfer connections from a data terminal of said radio local area network to another essentially without any operation of external systems which are not part of said radio local area network.

14. The radio local area network according to claim 13, wherein at least one of its nodes is defined as a mobile node of said general network intended for data transfer between computers, wherein it has a certain mobile node address in said general network intended for data transfer between computers, and said service device also incorporates means for saving information on whether said node defined as a mobile node is in said radio local area network or not, and what is the current routing of the data transfer connection to said node defined as a mobile node.

15. The radio local area network according to claim 13, wherein said service device is essentially the same as said first gateway.

16. The radio local area network according to claim 11, further comprising a third gateway for arranging a data transfer connection between said radio local area network and a certain general, wired network intended for data transfer between home and office data terminals, and for carrying out the required protocol conversions between the data transfer protocols used in said radio local area network and the data transfer protocols used in the general, wired network intended for data transfer between home and office data terminals.

17. The radio local area network according to claim 16, wherein said third gateway is essentially the same as said first gateway or said second gateway.

18. A gateway (1) for establishing a data transfer connection between a radio local area network and a general cellular radio network, which general cellular radio network comprises a mobile switching centre MSC, base station controllers BSC and base stations BS, wherein it comprises:
 a radio transmitter/receiver for providing a radio interface for a data terminal located in said radio local area network,
 a line transmitter/receiver for providing an interface for the mobile switching centre MSC of said general cellular radio network, which interface is essentially similar to the interface between the mobile switching centre MSC and the base station controller BSC defined in said general cellular radio network, and
 means for carrying out protocol conversions between data transfer protocols used in said radio local area network and data transfer protocols used in said general cellular radio network.

19. The gateway according to claim 18, further comprising a line transmitter/receiver for providing an interface for a certain general network intended for data transfer between computers, and means for carrying out the required protocol conversions between the data transfer protocols used in said radio local area network and the data transfer protocols used in said general network intended for data transfer between computers.

20. The gateway according to claim 18, further comprising a line transmitter/receiver for providing an interface for a certain general, wired network intended for data transfer between home and office data terminals, and means for carrying out the required protocol conversions between the data transfer protocols used in said radio local area network and the data transfer protocols used in said general, wired network intended for data transfer between home and office data terminals.

21. The gateway according to claim 18, further comprising means for saving information about the nodes which at each time are located in said radio local area network and about connections between them, and means for changing the saved information when one of the nodes of said radio local area network moves in relation to the other nodes or moves out of the network or comes to the network, and means for routing data transfer connections from a data terminal of said radio local area network to another essentially without any operation of external systems which are not part of said radio local area network.

22. The gateway according to claim 19, further comprising means for saving information on:
 whether said radio local area network includes nodes which are defined as mobile nodes of said general network intended for data transfer between computers, whereby they have a certain mobile node address in said general network intended for data transfer between computers,
 whether said nodes defined as mobile nodes are in said radio local area network at a given moment or not, and
 what is the current routing of the data transfer connection to said nodes defined as mobile nodes.

23. A method for implementing an electric data transfer connection between two data terminals provided with radio transmitter/receivers, which data terminals can operate in a radio local area network the data terminals of which, provided with radio transmitter/receivers, constitute nodes, wherein the method comprises the following operations:
 a first of said data terminals, which starts a communication, establishes a connection to a first gateway controlling the operation of a first radio local area network, and notifies that said first data terminal wants to establish a data transfer connection to a certain other data terminal and also notifies whether it wants a telephone connection or a slow or fast data connection;
 on the basis of information saved in its storage media, said first gateway determines whether a second of said data terminals is in the same first radio local area network as said first data terminal;
 if said first and said second data terminals are in the same radio local area network, said first gateway routes the connection between them using nodes which are located in said first radio local area network;
 if said first and said second data terminals are not in the same radio local area network and said first data terminal has notified that it wants a telephone connection or a slow data connection, said first gateway directs the connection request to a certain mobile switching centre MSC of a general cellular radio system;

if said first and said second data terminals are not in the same radio local area network and said first data terminal has notified that it wants a fast data connection, said first gateway directs the connection request via a certain other gateway to the certain general network intended for data transfer between computers; and if said first and said second data terminals are not in the same radio local area network, but said second data terminal is in a certain other radio local area network from which there is a connection to said first radio local area network via a certain third gateway and a certain general, wired network intended for data transfer between home and office data terminals, said first gateway directs the connection request via said third gateway and said general, wired network intended for data transfer between home and office data terminals to said second radio local area network.

* * * * *